Patented Feb. 18, 1947

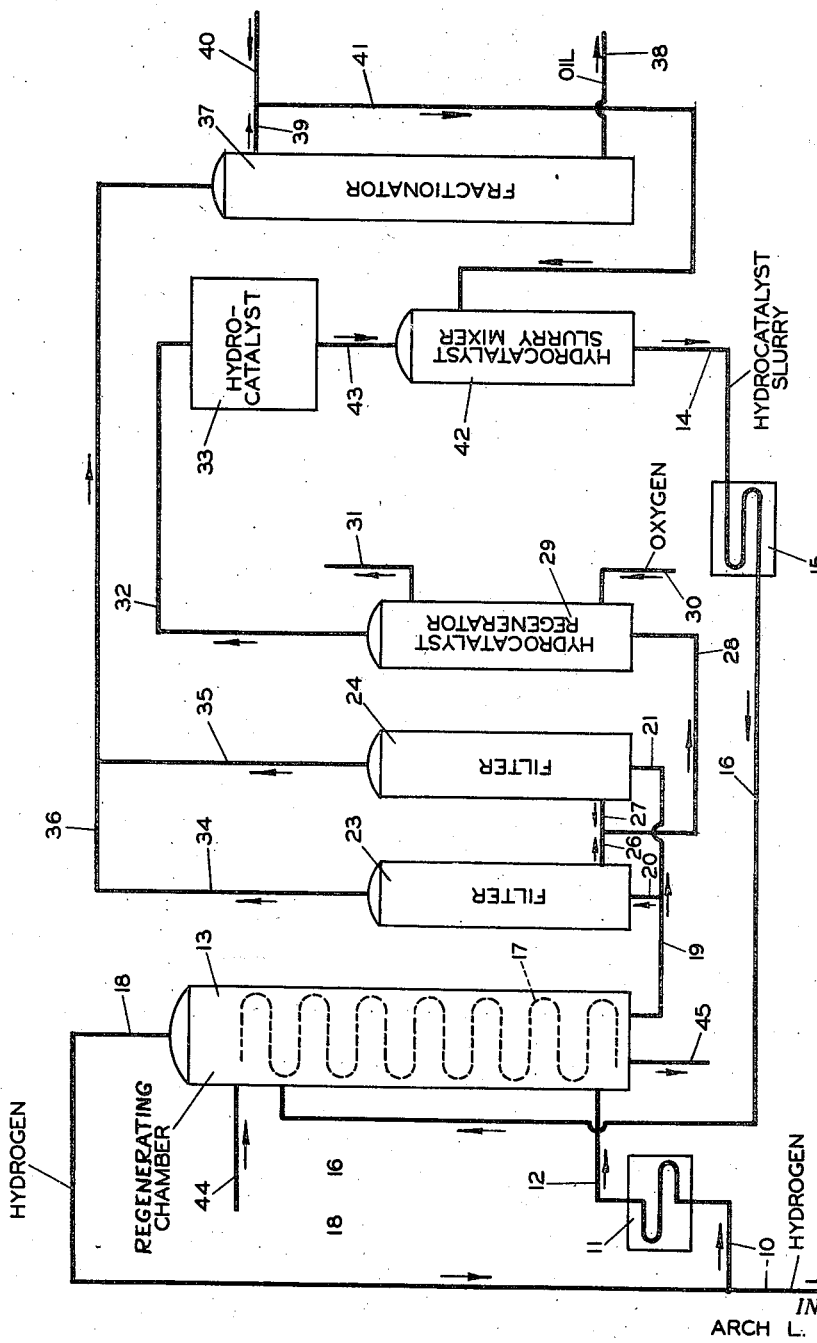

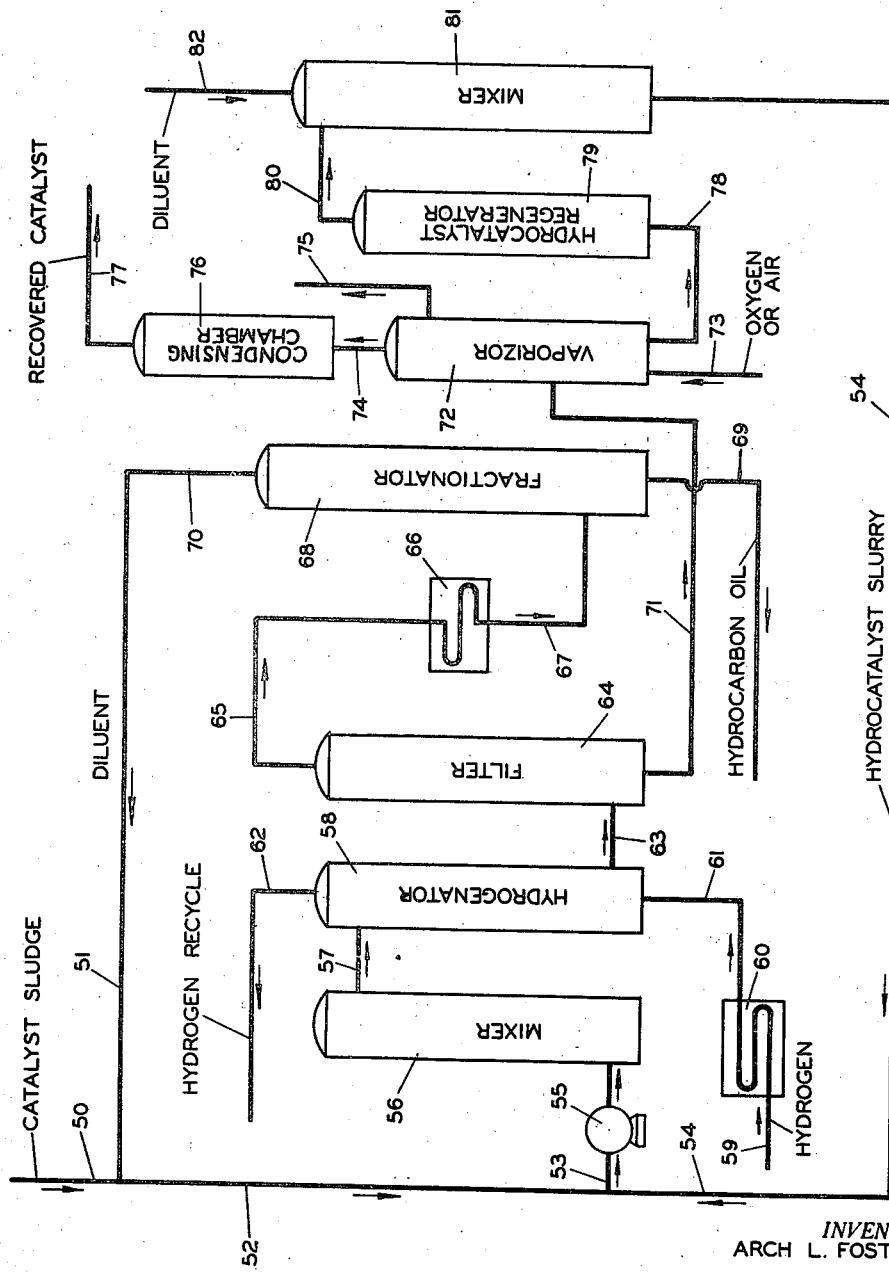

2,416,049

UNITED STATES PATENT OFFICE 2,416,049

REGENERATION OF SPENT CATALYST

Arch L. Foster, Bartlesville, Okla., assignor to Phillips Petroleum Company, a corporation of Delaware Application October 5, 1942, Serial No. 460,877

3 Claims. (Cl. 23—96)

This invention relates to the art of regenerating spent catalysts, and in its more specific aspects is concerned with the regeneration of metal halide catalysts which have become degraded in the course of promoting certain chemical reactions, such as those occurring in certain hydrocarbon conversion processes, to the extent that they are unable to perform their normal function in an effective and economical manner.

As is well known to persons skilled in the art, a number of hydrocarbon reactions and conversions may be carried out in the presence of various types of catalysts. It has been discovered comparatively recently that metal halide catalysts may be advantageously utilized in carrying out certain hydrocarbon conversions. Aluminum chloride has been found to be among the more important catalysts in this group. One of the major problems encountered in the industry has been that of regenerating metal halide catalysts to thereby recondition the same in order that they may be reused effectively. In the course of carrying out the hydrocarbon processes, referred to above, in the presence of metal halide catalysts, the catalysts become degraded and substantially spent as they eventually become coated with heavy hydrocarbon materials. Considerable difficulty has been encountered in reconditioning these catalysts. Metal halide catalysts such as aluminum chloride, due to their volatility, cannot, as a rule, be regenerated by the usual methods employed in regenerating nonvolatile catalysts. Material, such as sludges, carbon, and the like, that blankets these catalysts cannot be removed by the oxidation of the same at temperatures in the region of 1200° F. and higher, since the catalyst itself will become decomposed and volatilized at such temperatures under normal pressure conditions. This results in the loss of valuable constituents. Another difficulty usually encountered resides in the fact that sludges formed with metal halide catalysts combine chemically to a greater or lesser degree with the catalyst and cannot be separated therefrom by purely mechanical means in their original state when the catalyst mass is subjected to a reactivating treatment. It will, hence, be evident that it is extremely essential that proper steps be taken to remove sludge, including carbonaceous material from the spent catalyst, in such a manner that the catalyst may be recovered in a substantially pure state.

My present invention contemplates the regeneration of degraded metal halide catalysts by the use of hydrogen, which may be either pure molecular hydrogen or a free hydrogen-containing gas that is composed of hydrogen and one or more other constituents that are basically inert when employed in the practice of my invention, such as light hydrocarbon gas, flue gas, nitrogen, deoxygenated air, or the like. Temperatures within the range of 500 to 1200° F. and up may be employed, and in general, the pressures attained in the practice of my invention range from 100 to 1000 pounds per square inch. In order to secure optimum recovery of the metal halide catalyst, the pressure should at all times be maintained sufficiently high so that none of the catalysts will be volatilized, and thereby lost during the regeneration procedure. Spent catalysts employed in relatively low temperature processes are usually fluid, and are relatively high in hydrogen to carbon ratio. For these catalysts the temperatures, pressures and reaction times are comparatively lower than the corresponding temperatures, pressures and reaction times that are necessary to regenerate spent catalysts obtained from high-temperature and long time reaction processes. The spent catalysts from the latter type of processes are generally solid in consistency and high in carbon content.

The instant invention is applicable to the regeneration of spent or degraded metal halide catalysts that may be either in a solid or fluid state. My invention teaches the regeneration of solid catalysts in situ, and the regeneration of fluid or semi-fluid catalysts, such as sludges of the same, by the mixture thereof with a hydrocatalyst that is also preferably fluid, such as a slurry, before regeneration. The spent catalyst, whether in a solid or a fluid state is brought into intimate contact with free hydrogen and the hydrocatalyst under temperature and pressure conditions that will result in effective hydrogenation of the spent catalyst without the loss of the metal halide catalyst by volatilization. The hydrocatalyst mentioned above may include any well known catalyst in the art that is adapted to promote hydrogenation of the spent catalyst. For example, the hydrocatalyst may be any one of the known catalysts, including metal oxides, sulfides, or the like. While the hydrocatalysts may be used in any desired form, I prefer to use the same in a finely divided or pulverulent condition in order that it may be readily suspended in a suitable hydrocarbon which acts as a solvent or diluent for the relatively heavy oils formed from the spent catalyst sludge in the course of hydrogenation. Wherever the term, "hydrocatalyst slurry," appears in this specification, it will be understood that the same refers to a fluid mixture comprising a hydrocatalyst and a relatively light hydrocarbon or other liquid, capable of being advantageously employed with my invention. In this connection it is recommended that the hydrocatalyst slurry employed be such that it will not dissolve appreciable amounts of the metal halide catalysts. Sludge solvents such as those disclosed in my copending application, Serial No. 459,579, filed on September 24, 1942, are satisfactory for use with my invention. It has also been found that low viscosity oils, such as light gas oil, solar oil, mineral seal oil, or a similar oil of low volatility and low residual carbon content and substantially free of solid, asphaltic, or bituminous material, is also satisfactory.

This invention has for its primary object the removal of carbonaceous material, such as hydrocarbon sludge, from spent catalysts.

Another object of this invention is the removal of carbonaceous material from spent metal halide catalysts in such a manner as will leave the catalyst in a substantially completely revivified condition, with the greater portion of its original activity as a catalyst restored for reuse.

A further object of this invention is the regeneration of degraded catalysts by the hydrogenation thereof, either in the presence of or in the absence of a hydrogenation catalyst.

This invention has for another object the revivification of a volatile catalyst, such as aluminum chloride, by changing its chemical condition in a sludge containing the same so that it may be readily separated from the sludge and recovered for reuse.

A still further object of this invention is the regeneration of spent metal halide catalysts that are contained in hydrocarbon sludges of the same, and the recovery of hydrocarbon material from the sludge as a useful commercial product or a crude material that is convertible into one or more useful commercial products.

These, as well as other objects and advantages, will be readily apparent to persons skilled in the art from the following detailed description and the annexed drawings which respectively describe and illustrate preferred arrangements of apparatus for carrying out the invention.

Figure 1 is a schmatic representation of apparatus for use in regenerating spent solid metal halide catalysts in accordance with my invention.

Figure 2 is a schematic representation of apparatus for use in regenerating spent fluid or semi-fluid metal halide catalysts in accordance with my invention.

Referring now to the drawings, and more particularly to Figure 1 thereof, I have denoted therein a conduit 10 through which a free hydrogen-containing gas of the character indicated earlier is transmitted into a preheater 11, wherein the same is heated to a temperature preferably between 300 and 1000° F., and is then transmitted through a conduit 12 into the lower portion of a chamber 13 under a pressure up to about 1000 pounds per square inch gauge. Chamber 13 contains a quantity of solid degraded metal halide catalyst, such as spent aluminum chloride. The degraded catalyst is placed in chamber 13 through a charging means 44 and is withdrawn therefrom after regeneration through a discharge means 45. The degraded or spent catalyst may be one obtained from a hydrocarbon conversion process, and contains hydrocarbon material. A hydrocatalyst slurry in conduit 14 is preheated in a unit 15 and then transmitted through line 16 into the upper portion of chamber 13. It is recommended that the hydrocatalyst slurry contain from 5 to 50% of the hydrocatalyst material in suspension, the percentage of this material depending upon the porosity of the degraded metal halide catalyst, its refractoriness, and its general condition. The degraded catalyst in chamber 13 is heated by an element 17 disposed therein to a temperature whereby the degraded material may be properly and effectively hydrogenated. The amounts of free hydrogen-containing gas and hydrocatalyst slurry admitted into chamber 13 are preferably such as will result in the optimum rate of hydrogenation of degraded metal halide catalysts in said chamber. It will be obvious that these rates will vary, depending upon various factors. It will be equally obvious that the proper rates may be readily determined by persons skilled in the art in each particular case, for example, by trial. For best results the amount of free hydrogen that is circulated through the degraded catalyst in chamber 13 should at all times be greatly in excess of that required for carrying out the hydrogenation procedure. It is preferred that not more than about 20% of the hydrogen admitted into chamber 13 be consumed during a single passage through the degraded bed. Unconsumed hydrogen is withdrawn as an overhead product from the top of chamber 13 and is recycled through a conduit 18 to conduit 10. In the course of the hydrogenation of the material in chamber 13, hydrocarbons and other carbonaceous materials contained in the degraded catalyst are converted into fluid hydrocarbons, such as oils; and the oil thus formed, together with hydrocatalyst slurry is discharged from the bottom of chamber 13 through line 19 and thence through branch lines 20 and 21 into a pair of filters 23 and 24, respectively. Hydrocatalyst material in a solid state is removed from the mixture introduced into filters 23 and 24 and is continuously or periodically unloaded by means of conveyer lines 26 and 27, which connect with a main conveyer line 28 that communicates with a hydrocatalyst regenerator unit 29. Free oxygen-containing gas for use in the regeneration of the hydrocatalyst in unit 29 is supplied by a conduit 30, and the products of combustion, such as carbon dioxide, carbon monoxide, as well as unconsumed oxygen, are discharged from regenerator 29 by way of line 31. Substantially pure revivified hydrocatalyst is carried by a suitable conveyer 32 into a storage receptacle, or the like, 33. The oil and other fluid material that is separated in filters 23 and 24 are discharged therefrom through branch conduits 34 and 35, respectively, which communicate with a main discharge line 36 that communicates with a fractionator or similar separator unit 37. The material thus admitted into a fractionator 37 is separated in the usual manner, the oil being withdrawn through a conduit 38 and the remainder of the fluid in the nature of a diluent being withdrawn through a conduit 39. The diluent from conduit 39 and necessary makeup diluent supplied by a conduit 40 are introduced through a line 41 into a mixer 42, wherein it is mixed with solid hydrocatalyst that is transmitted thereto by means of a conveyer 43 to form hydrocatalyst slurry for passage through conduit 14. The above described cycle is then repeated.

Turning next to the arrangement of apparatus illustrated in Figure 2 of the drawings, reference numeral 50 indicates a conduit through which degraded metal halide catalyst of the character indicated above but in a fluid or sludge condition, and a suitable diluent in a conduit 51 are combined in a line 52 that communicates with a conduit 53. As is evident from Figure 2 this said diluent is the same diluent that is used to make up the hydrocatalyst slurry and is recycled continuously throughout the process, as shown. As previously indicated the diluent is preferably a non-solvent for both hydrocatalyst and the metal halide catalyst to be regenerated and acts merely as a diluent for the sludge or a suspending medium for the hydrogenating catalyst. A line 54 for transmitting hydrocatalyst slurry also communicates with conduit 53. The materials transmitted into conduit 53 by the above mentioned conduits and lines are forced by a pump 55 into a mixer 56. It is recommended that the proportions of hydrocatalyst slurry to metal halide catalyst sludge be between the ratios of 5:1 and 1:10 for best results. After being thoroughly agitated in mixer 56, the composite material contained therein is transmitted by a conduit 57 into the upper portion of a hydrogenating unit 58. Free hydrogen-containing gas supplied by a conduit 59 is preheated in a unit 60 and is then transmitted into hydrogenating unit 58. Hydrogenating unit 58 operates in a manner similar to that discussed with regard to chamber 13 in Figure 1. It will be evident that this unit may consist of a single chamber, as illustrated, or of several chambers, in a series or in parallel, the number and arrangement of the same depending on the character of the metal halide catalyst sludge to be treated. Unconsumed hydrogen is taken off the top of unit 58 and may be recycled to conduit 59 if desired. The hydrogenated slurry is removed from unit 58 through a line 63, either continuously or intermittently, and is taken to a filter or settler 64. The material withdrawn from chamber 58 comprises hydrocarbons, solid hydrogenating catalyst and solid metal halide catalyst which has been regenerated. The metal halide catalyst may be soluble to some extent in the light hydrocarbons but since these light hydrocarbons are continuously recycled as the diluent, as shown in Figure 2, they become saturated with said metal halide catalyst as the result of which no further metal halide is dissolved after saturation. For this reason most of the metal halide regenerated from the sludge is present in the solid state in the material withdrawn from chamber 58. A mixture of hydrocarbon oil and diluent is separated from catalyst material in filter 64 and is discharged therefrom through a line 65 which communicates with a heater 66. Heater 66 serves to preheat this mixture before it is transmitted through a conduit 67 into a fractionator or other separating means 68. Fractionator 68 is operated in the usual manner to separate the material admitted thereto into hydrocarbon oil which is removed through a conduit 69 and diluent which is taken off as a top product through a conduit 70 that communicates with conduit 51. The catalyst material, including both metal halide catalyst and hydrocatalyst components, is transported by conveyer 71 into a vaporizer 72. Air or other free oxygen-containing gas is supplied to vaporizer 72 by means of a conduit 73. Vaporizer 72 is operated under conditions whereby the metal halide component of the mixed catalytic material therein is vaporized and removed therefrom through a conduit 74 that communicates with a chamber 76, wherein said metal halide catalyst is condensed. Since the catalyst material introduced into vaporizer 72 contains occluded hydrocarbon materials which were not completely separated from the catalyst in filter 64, the oxygen-containing gas may combust this hydrocarbon material to supply the heat for vaporization of the metal halide catalyst. The metal halide catalyst will sublime or vaporize in vaporizer 72 and be removed as overhead while the hydrogenating catalyst of substantially less volatility will be withdrawn as bottom product from vaporizer 72. The metal halide catalyst thus recovered is transmitted through a line 77 to suitable storage facilities (not shown) or may be immediately reused, as desired. The products resulting from the combustion in the operation of vaporizer 72 are discharged through a conduit 75. Hydrocatalyst material is removed from vaporizer 72 by means of a conveyer 78, is regenerated in a unit 79 that is similar to the corresponding equipment illustrated in Figure 1, and is then transported by a conveyer 80 into a unit 81, wherein it is thoroughly agitated and mixed with diluent that is supplied by a conduit 82, to thereby form necessary hydrocatalyst slurry that is handled by conduit 54.

No attempt has been made to set forth specific conditions of temperature and pressure under which the various items of equipment illustrated in the drawings should be operated, since the same depend to a great extent upon the particular conditions encountered; and further, since the same may be readily ascertained by persons skilled in the art.

From the foregoing, it is believed that the many advantages obtainable by the practice of the present invention will be readily apparent to persons skilled in the art. However, since certain changes may be made in carrying out the above process without departing from the scope of the invention as defined by the appended claims, it is intended that all matter contained herein shall be interpreted as illustrative and explanatory, rather than in a limiting sense.

What I claim is:

1. A process for the regeneration of a metal halide catalyst that has become contaminated with carbonaceous deposits in use for the conversion of hydrocarbons, which comprises the steps of admixing a hydrocarbon diluent, a hydrogenating catalyst and a sludge of a contaminated metal halide catalyst, passing said mixture into a regenerating zone, passing a free hydrogen-containing gas through said mixture in said zone, maintaining a temperature between about 500° F. and about 1000° F. and a superatmospheric pressure sufficiently high to prevent volatilization of any metal halide catalyst in said zone, discharging unconsumed hydrogen from said zone, removing a resulting mixture comprising hydrogenating catalyst, hydrocarbons and a solid metal halide catalyst from said regenerating zone, separating said hydrocarbons from said hydrogenating and said metal halide catalysts by filtration, fractionating said separated hydrocarbons and recycling the overhead of said fractionation as a diluent, passing said hydrogenating and metal halide catalysts to a vaporizing zone, vaporizing said metal halide catalyst and removing same as an overhead product therefrom for recovery, and removing said hydrogenating catalyst as a bottom product from said vaporizing zone.

2. An improved process for recovering aluminum chloride from a liquid hydrocarbon-aluminum chloride sludge, which comprises intimately admixing with said liquid sludge a finely divided solid metal oxide hydrogenation catalyst with a ratio of said catalyst to said sludge between 5:1 and 1:10 and a low-boiling liquid hydrocarbon solvent, treating said mixture at a hydrogenation temperature between 500 and 1200° F. with free hydrogen at a pressure of 100 to 1000 pounds per square inch and effecting a hydrogenation of said sludge and a release of free aluminum chloride, removing resulting mixed solid aluminum chloride and hydrogenation catalyst from a liquid hydrocarbon material, distilling said material to produce a low-boiling hydrocarbon fraction and high-boiling hydrocarbon fraction, returning said low-boiling fraction to said hydrogenation as said solvent, treating said mixed solid materials with oxygen under conditions such as to vaporize aluminum chloride and to burn carbonaceous material, separating vapors so produced from residual solid metal oxide, recovering aluminum chloride from said vapors, and returning said metal oxide to said hydrogenation.

3. An improved process for recovering a solid volatile metal halide catalyst from a liquid hydrocarbon-solid metal halide sludge, which comprises intimately admixing with said liquid sludge a finely divided solid metal oxide hydrogenation catalyst with a ratio of said catalyst to said sludge between 5:1 and 1:10 and a low-boiling liquid hydrocarbon solvent, treating said mixture at a hydrogenation temperature between 500 and 1200° F. with free hydrogen at a pressure of 100 to 1000 pounds per square inch and effecting a hydrogenation of said sludge and a release of free solid metal halide, removing resulting mixed solid metal halide and hydrogenation catalyst from a liquid hydrocarbon material, distilling said material to produce a low-boiling hydrocarbon fraction and high-boiling hydrocarbon fraction, returning said low-boiling fraction to said hydrogenation as said solvent, treating said mixed solid materials with oxygen under conditions such as to vaporize said metal halide and to burn carbonaceous material, separating vapors so produced from residual solid metal oxide, recovering said metal halide from said vapors, and returning said metal oxide to said hydrogenation.

ARCH L. FOSTER.

REFERENCES CITED

The following references are of record in the file of this patent:

UNITED STATES PATENTS

| Number | Name | Date |
|---|---|---|
| 1,620,075 | Clancy | Mar. 8, 1927 |
| 2,289,731 | Roelin et al. | July 14, 1942 |
| 2,317,494 | Thomas | Apr. 27, 1943 |
| 2,293,891 | Evering et al. | Aug. 25, 1942 |
| 2,348,408 | Page, Jr. | May 9, 1944 |
| 2,348,701 | Schmerling | May 9, 1944 |

FOREIGN PATENTS

| Number | Country | Date |
|---|---|---|
| 374,597 | British | Feb. 11, 1932 |
| 192,106 | British | Jan. 22, 1923 |